United States Patent [19] [11] 4,134,174
Flynn et al. [45] Jan. 16, 1979

[54] SEWER AND CATCH BASIN CLEANER

[75] Inventors: Thomas P. Flynn; James C. Wurster, both of Milwaukee, Wis.

[73] Assignee: Super Products Corporation, Milwaukee, Wis.

[21] Appl. No.: 828,631

[22] Filed: Aug. 29, 1977

[51] Int. Cl.² .................... B08B 3/02; B08B 9/04
[52] U.S. Cl. .................... 15/302; 15/315; 15/340; 15/352; 15/353; 134/104; 134/168 C
[58] Field of Search .......... 15/302, 314, 320, 321, 15/315, 319, 340, 352, 353; 134/104, 167 R, 167 C, 168 R, 168 C; 210/333 R, 335

[56] References Cited

U.S. PATENT DOCUMENTS

| 2,681,153 | 6/1954 | Armbrust | 210/333 X |
| 2,879,067 | 4/1957 | Link, Jr. | 15/83 X |
| 3,291,144 | 12/1966 | Diamond | 134/104 |
| 3,600,225 | 8/1971 | Parmelee | 134/168 C X |
| 3,658,589 | 4/1972 | Shaddock | 134/168 C X |
| 3,774,260 | 11/1973 | Emus, Jr. | 15/353 X |
| 3,870,489 | 3/1975 | Shaddock | 15/340 X |
| 3,942,214 | 3/1976 | Maasberg | 15/340 X |

FOREIGN PATENT DOCUMENTS 584806 10/1959 Canada .................... 15/321

Primary Examiner—Christopher K. Moore

[57] ABSTRACT

A sewer and catch basin cleaner includes a system for injecting water under pressure into a sewer lateral for cleaning same and a vacuum loading system for removing the cleaning water and resultant debris from the sewer catch basin or manhole. The cleaner includes a water storage tank for providing the cleaning water and a body for receiving the liquid and debris removed from the catch basin or manhole. Water filtration and reclamation means are provided intermediate the body and water tank to provide a continuous supply of cleaning water without the need for interrupting operation of the cleaner to load water. This feature reduces the total amount of clean water which is consumed during sewer cleaning. The preferred embodiment of the present invention includes means for periodically cleaning the water filters, means for sensing the water level in the vacuum body, means for venting the vacuum body to the atmosphere when the water level reaches a predetermined height and ejector means for pushing accumulated debris from the body when the sewer cleaning operation is completed. The sewer cleaner of the present invention also includes a novel water and vacuum hose arrangement and boom means for properly locating the two hoses over the manhole or catch basin. For truck mounted equipment, the latter feature reduces obstruction of traffic when sewer cleaning is being carried out on or adjacent to busy streets or highways. Variations of these and other components of the cleaner of the present invention are also described.

35 Claims, 3 Drawing Figures

SEWER AND CATCH BASIN CLEANER

FIELD OF INVENTION

The present invention relates generally to the art of sewer cleaning and more particularly to mobile sewer and catch basin cleaners of the type which include a system for injecting water into a sewer lateral to clean the same and a vacuum system for removing debris washed from a sewer lateral into a catch basin or manhole. Still more particularly the present invention relates to equipment which includes a system for continuously filtering the water removed from the catch basin or manhole so that reclaimed water can be employed in the sewer cleaning operation.

BACKGROUND OF THE INVENTION

Over the last forty years or so a number of sewer cleaning processes and machines have been developed to replace a system which had been employed for many decades. That process involved the cleaning of sewer lines by dragging buckets through them. Tripods were placed above adjacent manholes and a cable was fed manually between the manholes and through the laterals. Buckets were attached to the cable and dragged through the sewer lines by a motor and winch.

This very old sewer cleaning process has numerous disadvantages. The process was very labor intensive and involved the difficult step of inserting the cable between adjacent manholes. Moreover, the buckets did not effectively clean laterals which were substantially larger than the diameter of the buckets, and buckets cannot easily be pulled past obstructions in the sewer, such as roots or broken pieces of the sewer pipe.

Before proceeding with a description of further prior art, it will be helpful to briefly describe a typical sanitary sewer system for purposes of illustrating not only the prior art but the sewer cleaner of the present invention. A manhole is typically found at or near the intersection of cross streets. The manhole itself is usually cylindrical in shape and is the junction for four sewer laterals which typically enter the manhole at 90° angles with respect to each other. Two or three of the laterals are sloped downwardly toward the manhole and enter the manhole at or near its bottom. The other lateral(s) typically leave the manhole and slope downwardly toward another remote manhole. The discharge laterals also leave the manhole at or near its bottom. An entire city or suburban sewer system may be interconnected by laterals and manholes and the slope is selected so that all sewage eventually reaches a sewage treatment facility. Storm sewer systems are similar to that just described but include a catch basin instead of a manhole. The catch basin usually includes a sump below the entrance of the laterals.

To clean such sewer systems and overcome the difficulties of mechanical removal of debris using buckets, several types of sewer cleaning procedures have been developed and are described in the patent art. On Nov. 6, 1883, U.S. Pat. No. 287,811 was issued to Dougine for "Cleaning Sewers." This patent describes a combination water injection and water pumping machine for flushing a sewer with water and removing the water and collected debris from settling chambers associated with the sewer lines.

More recent developments are described in Parmelee's U.S. Pat. No. 3,600,225 issued Aug. 17, 1971 for "Pipe Cleaning" and Shaddock's U.S. Pat. No. 3,658,589 issued Apr. 25, 1972 for "Catch Basin and Sewer Pipe Cleaner." In both of these patents, water under pressure is injected into sewer laterals through specially designed nozzles to wash debris into a manhole or catch basin.

The nozzles employed in the latter two patents are of a kind known for many years in the sewer cleaning art and include a threaded portion for being coupled to a water hose. The nozzles have a plurality of water jets, the jets being oriented so that after the nozzles are inserted into the sewer line, the jets are directed backwardly toward the catch basin or manhole. When water under pressure is supplied through the hose, the openings create water jets to force the nozzle up into the sewer lines. When the nozzle is retracted, the water jets further clean the sewer by a knife-like action and the additional water flushes loosened debris toward the catch basin or manhole.

The Parmalee and Shaddock patents differ primarily in the water injection and water recovery systems. In Parmalee, a screen is placed over a water recovery hose and water is pumped from a manhole into a settling tank, through a grit remover and centrifugal separator to a storage tank for being reused in the cleaning process. Parmalee does not include a vacuum system for removing large solids from the manhole. Shaddock on the other hand, employs a vacuum system for pneumatically conveying debris and water from the catch basin into a material collection chamber.

While these two patents disclose machines which represent significant improvements over the aforementioned bucket cleaning system, they still have several significant disadvantages. Parmalee's system of water reclamation is not employed with pneumatic or vacuum loading. Shaddock's device, on the other hand, must be reloaded with water at the beginning of each cleaning operation, or sewer cleaning must be carried out at a location near a water supply, such as a fire hydrant or water main. This deficiency results in extended downtimes, inconvenience and loss of overall efficiency. A sewer cleaning machine which overcomes these problems would be a significant advance in this technology.

OBJECTS OF THE INVENTION

It is a primary object of the present invention to provide a new and improved mobile sewer and catch basin cleaner which overcomes the above-noted disadvantages of the prior art.

Another object of the present invention is to provide such a cleaner which includes a water filtration and reclamation system to permit extended sewer cleaning operating time without excessive use of clean water.

Yet another object of the present invention is to provide a means for automatically and effectively cleaning said water filtration and reclamation system to prevent clogging thereof.

Still another object of the invention is to provide a water level sensing system in the material collection body of said mobile sewer and catch basin cleaner and means for preventing overfilling of said body.

Another object of the present invention is to provide a sewer and catch basin cleaner which includes a pusher-plate ejector means for removing accumulated debris from a collection body.

Another object of the present invention is to provide a novel vacuum hose and water hose arrangement for mobile sewer and catch basin cleaners.

How these and other objects of the invention are accomplished will be described in the following specification taken in conjunction with the FIGURES. Generally, however, the objects are accomplished by providing a mobile sewer and catch basin cleaner which includes a material collection body, a vacuum pump and a hose associated therewith for vacuum loading material into said collection body. The cleaner also includes a water tank coupled to said body and a water hose and water pump for pumping water under pressure through said hose. Located between said collection body and said water tank is a water purification system designed to remove solids from the water entering the body through the vacuum hose. Means are provided for periodically cleaning the filter system to prevent clogging thereof. Additionally, the cleaner includes a liquid level sensing system in the collection body and means for venting the body to the atmosphere when the liquid level in the body reaches a predetermined height. Such venting stops the vacuum loading of the body and prevents overfilling of same. Finally, the cleaner of the present invention features vacuum and water hoses and a boom means extending over the cab of the truck which allows the hoses to be properly located at the cleaning site, whether that site is in the street itself or on an adjacent sidewalk or median strip. This latter feature prevents traffic obstruction when the machine is used on busy streets and highways. Various modifications which assist in accomplishing the foregoing objects are also described in the following specification.

DESCRIPTION OF THE PREFERRED EMBODIMENT

Figure 1:
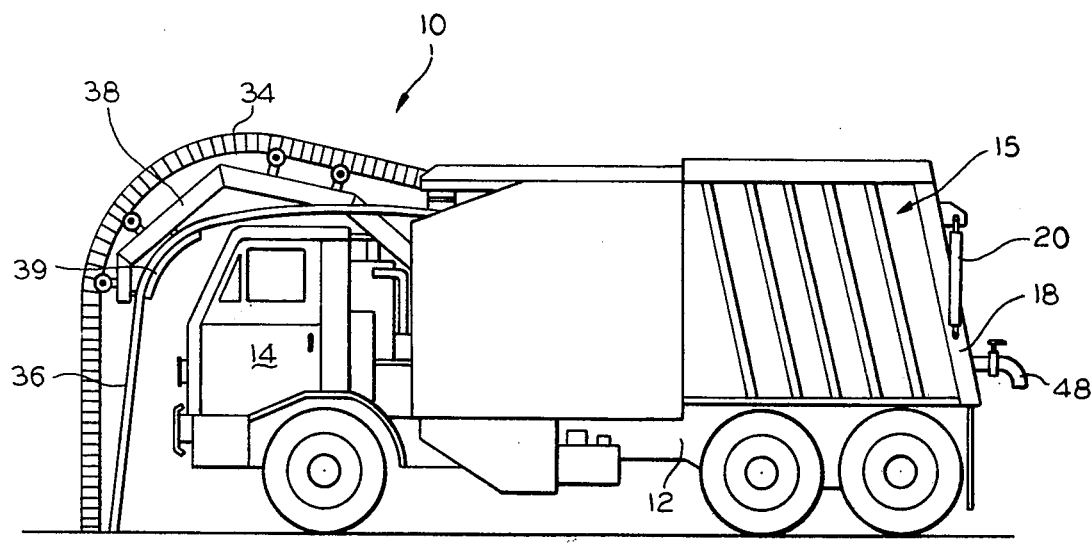
FIG. 1 is a side perspective view of a sewer and catch basin cleaner according to the preferred embodiment of the present invention.

FIG. 1 shows in perspective view a sewer and catch basin cleaner 10 according to the preferred embodiment of the present invention. Cleaner 10 is mounted on the chassis 12 of a truck which includes a cab 14 at its forward end. While cleaner 10 is shown mounted on a truck, it should be noted that the cleaner 10 could also be mounted on a trailer or it could be self-propelled, e.g. on a crawler tractor. Because of these various modifications, the description of the present invention in connection with truck mounting should be taken as illustrative rather than limiting.

As seen in FIG. 1 cleaner 10 includes a material collection body 15 which preferably is constructed from rib-reinforced sheet steel so that body 15 can withstand not only loading with water, but also the vacuum pressure which will exist in body 15. A tailgate 18 is provided at the rear of body 15, the tailgate being of sufficient size to permit the easy removal of debris from body 15. To facilitate debris removal, a pair of hydraulic cylinders 20 are suitably coupled to the rear of body 15 adjacent opposed edges of tailgate 18 to raise and lower it at the discretion of the machine operator. Suitable switch and control mechanisms are provided for activating cylinders 20, but the details thereof will not be provided as these components, in and of themselves, are old in the art and do not form part of the invention.

Also provided intermediate the tailgate 18 and body 15 is a gasket seal 22 (see FIGS. 2 and 3) for forming a water and vacuum tight seal, and a lock (not shown) for positively securing the tailgate against body 15 when the machine is in operation or when the body contains liquids or solids. The lock may be manually or hydraulically operated as desired.

Other major features of the present invention shown in the FIGURES include a water tank 26 located forwardly of body 15, a water pump 28 located forwardly of the tank 26, a hose reel 30 located in front of tank 26 on the near side of cleaner 10, a vacuum pump 32 also located in front of tank 26 and generally on the far side of cleaner 10, a pair of hoses 34 and 36 and a boom 38. Hose 34 is a vacuum intake hose (preferably corrugated), and as seen in FIG. 1, the hose is supported over cab 14 by boom 38. The water hose 36 is also supported by boom 38, beneath vacuum hose 34. A hose support 39 is mounted to boom 38 to allow hose 36 to be freely unreeled from reel 30. While not shown in detail, it should be recognized that boom 38 is both vertically elevatable and horizontally rotatable so that the free ends of both hoses 34 and 36 can be precisely located for cleaning.

Figure 2:
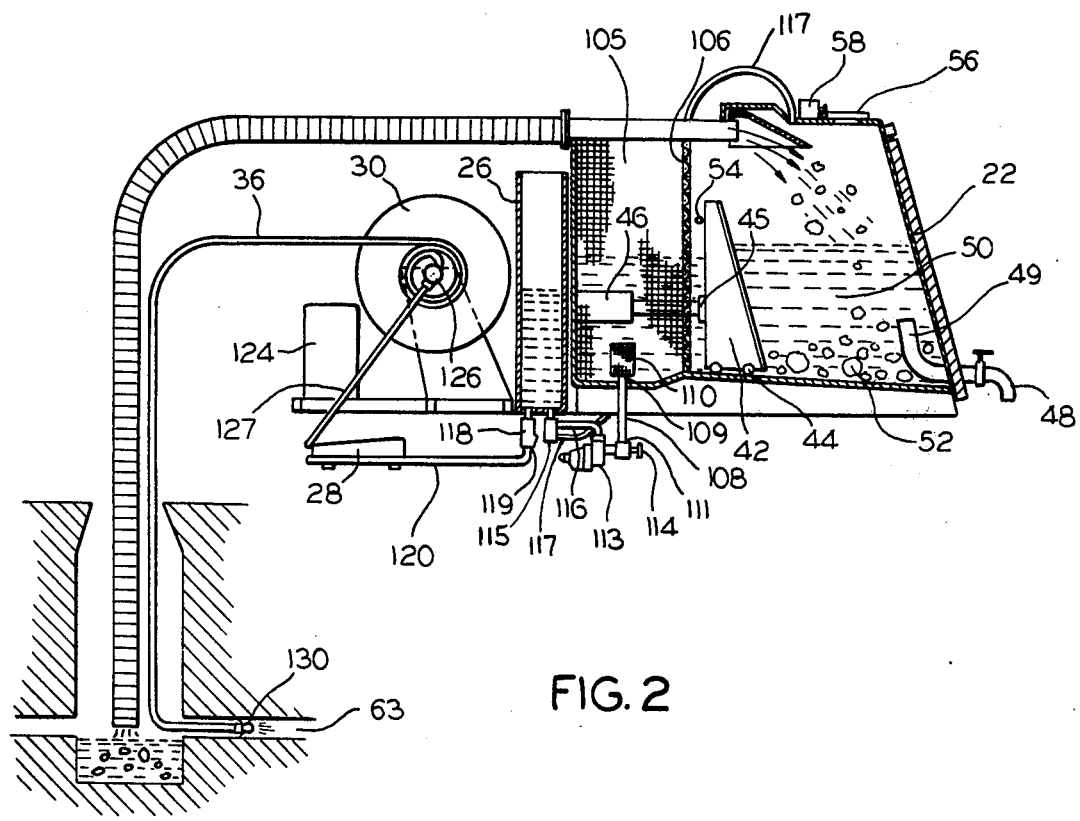
FIG. 2 is a side view, partially in section, taken inside the near side of the cleaner of FIG. 1, with parts removed for purposes of more clearly describing the water reclamation system of the present invention.

Referring now to FIG. 2, further components of cleaner 10 can be seen in this longitudinal partial cross-section which is taken inside the near side of cleaner 10 as it is shown in FIG. 1. Prominent in FIG. 2 is an ejector plate 42 which is mounted on rollers 44 for being moved longitudinally along the downwardly sloped floor of body 15 toward and away from tailgate 18. The plate 42 is generally triangular in cross-section and has a width just slightly less than the width of the interior of body 15. Its height should extend above the normal expected level of water to be contained in body 15, e.g. about ⅔ of the height of body 15 in the illustration. A telescopic ram 45 is provided for moving the plate 42 toward or away from the tailgate 18 when it is desired to remove debris from body 15. A hydraulic cylinder 46 and control means (not shown) are provided on cleaner 10 with appropriate switch means, so that the machine operator can extend ram 45 to empty body 15 when desired.

At the bottom of tailgate 18, a drain 48 is provided for draining fluids from body 15. Drain 48 is a manual drain in the illustration, but the drain may also be automatically operated in response to an appropriate signal from the machine operator. A stand pipe 49 is provided on the interior of the tailgate 18 communicating with drain 48.

Figure 3:
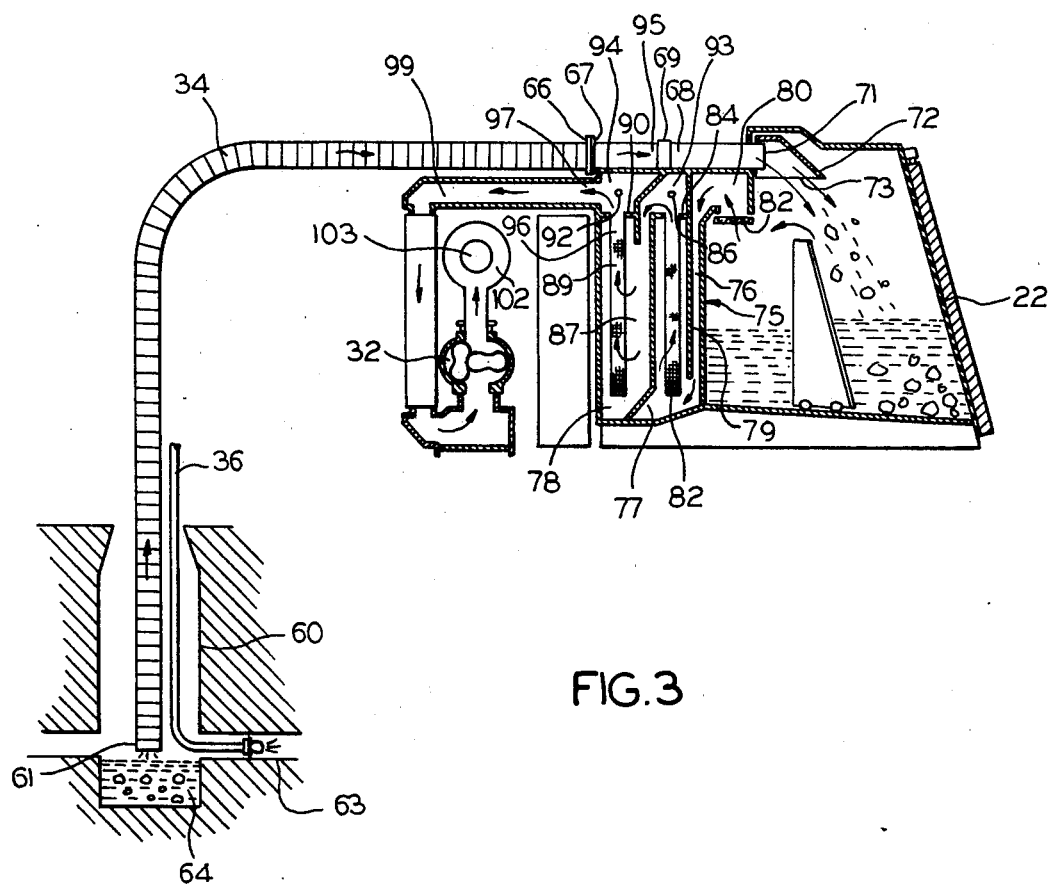
FIG. 3 is a side view, partially in section, taken inside the far side wall of the cleaner of FIG. 1, again with parts removed for purposes of more clearly describing the vacuum system of the present invention.

When body 15 contains a quantity of liquid 50 and solid debris 52 as shown in FIGS. 2 and 3, it will be appreciated that drain 48 can be opened to drain water 50 while leaving the solids 52 deposited on the floor of body 15. Cylinders 20 are activated to open tailgate 18, following which extension of ram 45 pushes the plate 42 toward the tailgate to shove the debris 52 and residual liquid out the opening at the rear of body 15.

It can also be noted in FIG. 2 that cleaner 10 includes a liquid level detector 54 mounted at the level of the maximum height of liquid to be contained in body 15, detector 54 being on the far side wall of body 15. The detector 54 in the illustrated embodiment is an ultrasonic liquid level detector having a stainless steel probe.

Such detectors are available from the National Sonics Division of Envirotech Corporation, e.g. the Model 501. This detector will not be described in detail because any type of detector which can generate a signal in response to the level of liquid reaching a certain height can be employed. While a visual or audible signal to the machine operator could be substituted for the liquid level detector 54, in the present invention a positive means is provided to prevent body overfilling. The protection system includes a hinge-mounted vent door or flap 56 mounted to the roof of body 15 (see FIG. 2). A seal is provided between the door 56 and the body for engaging a hole 57 in body 15 communicating with the interior thereof. A servo motor 58 is coupled to door 56 for opening and closing same in response to a signal generated by detector 54.

Should the level of water 50 reach the level of sonic detector 54, a signal is generated to the motor 58 which is activated to open the door 56 thus venting the vacuum body 15 to the atmosphere. This venting occurs at an air flow rate through the hole 57 sufficient to prevent additional vacuum loading of the body 15, as more fully explained in connection with FIG. 3.

The vacuum and water reclamation systems of the present invention will be described separately before a detailed discussion of the operation of cleaner 10 is attempted. The vacuum loading system is best understood by reference to FIG. 3 which is a longitudinal partial cross-section taken inside the far side wall of cleaner 10.

The vacuum hose 34 is shown inserted into a catch basin 60. The end 61 of hose 34 may be serrated to allow air to enter hose 34 along with liquid material, the air aiding in the pneumatic conveyance of liquid and solid particles into the body 15. Catch basin 60 is shown to include a lateral 63 entering the same and a sump area 64 beneath the opening of lateral 63. The other end 66 of hose 34 is coupled to the first end 67 of a replaceable conveying tube 68 which is mounted by bracket 69 to the top of body 15. Tube 68 is mounted longitudinally with respect to the body and approximately along the center line of the body 15. Tube 68 is replaceable because it, as well as vacuum hose 34, are subjected to wear during use by the high velocity flow of water and solids through the tubes.

The second end 71 of tube 68 is in turn coupled to a replaceable deflector 72 which includes a downward directed opening 73 to the interior of body 15. The opening is located at about the center line of body 15 and about ⅔ of the way toward its rear. It can be seen then that liquid and solids entering the body 15 do so rearwardly of the pusher plate 42 when it is in its retracted position shown in FIG. 3. It can also be seen in FIG. 3 that the solids entrained in the vacuum-fed water stream settled to the bottom of body 15 rearwardly of the pusher plate 42.

Located within body 15 and forwardly of pusher plate 42 is a generally box-shaped filter housing 75. The housing 75 is mounted to the front wall of body 15 at the right corner of body 15 (as viewed from the rear of the truck).

Filter housing 75 includes three chambers, 76–78, arranged respectively from the rear of filter housing 75 to its front. Chamber 76 is the entrance chamber and is defined by the back wall of housing 75 and an internal partition 79 extending from the top of housing 75 downwardly to a location spaced apart from its bottom. Chamber 76 is open at its upper end to the interior of body 15 through a box-like opening 80. A screen 82 protects the opening 80 into chamber 76 and prevents large air-born particles from entering the filter housing 75. The screen 82 may be a metal or plastic screen and typically has openings of about ¼" or so.

The second chamber 77 is for the first stage cloth filters 82. Five or more of such filters 82 are provided across chamber 77 and are supported by a plate 84 which extends across chamber 77 near its top. The filters 82 are cloth filters, cylindrical in shape and have a closed bottom and a top open to the upper portion of chamber 77. Typically the filters are supported by an internal wire frame (not shown). The filters themselves have not been described in detail because such filters are known in the filtering art.

Suspended above each of the filters 82 is a discharge pipe 86 which is coupled to a supply of compressed air, solenoid valves and controls (not shown), all for enabling the directing of a blast of compressed air down into filters 82 to knock accumulated debris therefrom onto the floor of filter housing 75. The filter cleaning system is also known. If greater detail is desired on the filters or the filter cleaning system, reference can be had to U.S. Pat. No. 3,885,932, issued to Lionel G. Morre et al. on May 27, 1975 for "Dust Filtration System." A similar filter system is described in detail in that patent for use in a truck-mounted industrial vacuum cleaner. The porosity of filters 82 in the preferred embodiment is about 10 microns, but other filter porosities may be employed so long as the porosity is low enough to remove entrained particles which could damage the vacuum pump 32. Chamber 77 is defined by partition 79 and another partition 87 which extends generally from the bottom of filter housing 75 to the first stage filter support plate 84. This partition 87 also forms the back wall of final chamber 78. Chamber 78 houses the second stage filters 89 and, as with the first stage filters, the second stage includes frame supported cloth filters 89, a filter support plate 90 and air discharge means 92 for cleaning the second stage filters.

A pair of plenums, 93 and 94 are located above the first and second filter chambers respectively. They are each generally formed by the top of body 15, the side walls of the filter housing 75 and the filter support plates 84 and 90 and are separated from one another by a divider partition 95 extending downwardly from the roof of housing 75 to a location below the plane of the filter support plates 84 and 90. A space 96 is defined between plenum 93 and chamber 78 to allow communication between these two areas. Finally, an exit opening 97 is formed in the front wall of plenum 94.

The remaining components of the vacuum system include a conduit 99 coupled between filter housing opening 97 and the vacuum pump 32. Pump 32 is preferably a positive displacement pump driven by a power take-off from the truck engine. A silencer 102 is also provided as well as a filtered air exhaust 103. It should also be appreciated that only one filter stage or more than two filter stages could be employed for particular job applications.

Now that the major components of the vacuum system have been described, its method of operation can be appreciated. Once the pump 32 is activated, an air stream is created between the inlet 61 of hose 34 and the clean air exhaust 103. The air stream carries water and solids through hose 34, tube 68 and deflector 72 into body 15. Practically all of the liquid and solid material will be deposited in body 15 under gravitational forces, while the air stream enters the filter housing 75 through opening 80.

The airflow path through filter housing 75 comprises downward flow through chamber 76 and an upward flow through filters 82 within chamber 77. During operation, the air blast cleaning system is activated at the discretion of the machine operator to knock accumulated debris from the outside of filters 82. As illustrated, the flow is from outside the filters to the inside thereof. The air leaves filters 82 and enters plenum 93 and is redirected by partition 95 into another downward flow path to enter chamber 78. After passing through filters 89, the air enters plenum 94, leaves the filter housing 75 through exit 97, travels through the conduit 99, pump 32, silencer 102 and is exhausted through outlet 103.

It can now also be appreciated how overfilling protection is provided by detector 54 and vent door 56. If door 56 is open, the flow of air will continue through housing 75, conduit 99, pump 32, etc., except a sufficiently large portion of the air creating such flow will enter body 15 through the door opening 57 to prevent the reduced flow entering through hose 34 from being able to continue with the pneumatic loading. Thus positive overfill protection for the filters and pump are provided.

The second major system in cleaner 10 is the water injection and reclamation system shown best in FIG. 2. In the illustrated embodiment no less than five filtration means are provided for purifying the water which is collected from catch basin 60 and deposited in body 15 by the vacuum system just described. The first filtration is conducted on a macro scale by pusher plate 42. As stated before, plate 42 is just slightly narrower than body 15 and the spaces along the edges of plate 42 and between it and the side walls and floor of body 15 are sufficient to allow the flow of water therebetween, but the space is sufficiently small to prevent large solid objects from reaching the area of body 15 behind plate 42. Plate 42 then acts as a liquid baffle and large particle separator and provides the first stage filtration in the water reclamation system of the present invention.

Also shown in FIG. 2 is strainer cage 105 which provides a solid particle barrier at the forward left corner of body 15 (generally opposite from filter housing 75). Cage 105 is open at its bottom and extends from the floor of body 15 to a location just below the roof of body 15. In the preferred embodiment the cage is formed by an L-shaped sheet of screening material 106, the sides of which are joined to the near side and front walls of body 15 to form the cage 105. The screen openings are selected to remove solids which pass by the pusher plate 42 and therefore screen cage 105 provides the second stage of water filtration in the water reclamation system of the present invention. Screen openings of between about 1/16" and ¼" are preferred for material 106.

An outlet for water 50 from body 15 is provided by a pipe 108 which extends perpendicularly through the floor of body 15 at a location within cage 105. A first end 109 of pipe 108 is located within the cage 105 and preferably spaced from the floor by several inches. A cylindrical screen 110 surrounds end 109 so that all water entering pipe 108 must pass through screen 110. Preferred dimensions of screen 110 are a diameter of about 5" and a length of about 8". Screen 110 is preferably prepared from screening material which has smaller openings than material 106 used for screen cage 105 and serves as the third water filtering stage of the water reclamation system of the present invention. Preferred openings in screen 110 are between about 1/32" and about 7/32".

The second end 111 of pipe 108, is coupled to a water recycling pump 113 mounted below the forward end of body 15. The pump 113 may be any type of known water pump, but preferably pump 113 is a hydraulically driven water pump having a capacity of about 40 gallons per minute or more.

Pipe 108 also includes an air inlet valve 114 between the floor of body 15 and the pump 113. The valve is provided for periodically admitting air from the atmosphere into pipe 108 and both the air inlet valve 114 and the cross-section of pipe 108 are selected so that the vacuum within body 15 during use of cleaner 10 will exceed the liquid head above the air inlet valve 114. The air inlet valve 114 may also be operated with an automatic timer if desired.

It will thus be appreciated that when valve 114 is open, air will enter pipe 108 and exit the end 109 thereof within the cylindrical screen 110. The air entering the screen 110 bubbles through the screening material thus freeing the same of any blockage or obstruction of the screen pores. This feature of the present invention permits use of relatively fine separating material for screen 110 and permits periodic cleaning of screen 110 without interrupting the sewer cleaning operation.

The next component of the water system is a particle separator 115 located between the water tank 26 and pump 113. Separator 115 includes an outlet communicating with tank 26 and an inlet opening which is coupled to pump 113 by a pipe 116. The preferred particle separator is a centrifugal, cone type separator such as the Model 2570-029 separator manufactured by Stemco Corporation of Oklahoma City, Okla. Separator 115 is designed to remove fine suspended particles from water 50 and thus comprises the fourth stage water filter in the water reclamation system of the present invention. The preferred separator described above removes those particles having a size of about 10 microns or more, thus providing relatively pure water to the water tank 26. If desired, the solids separated by separator 115 can be returned to the collector body 15 rearwardly of plate 42 such as by conduit 117. Such return may be aided by the vacuum existing in body 15 or gravity if separator 115 is located above body 15.

The final component in the water filter system shown in FIG. 2 is a Y-type cylindrical strainer 118 located forwardly of the separator 115. Strainer 118 includes an inlet opening communicating with the interior of water tank 26. While several different types of functionally equivalent strainers could be used, the preferred strainer is a 3" Style-S strainer manufactured by the Strong Division of Specialty Valve and Control Co. of Fairview, Pennsylvania. Strainer 118 is incorporated in the water system to provide additional protection (soon to be described) from solid particles.

The outlet of strainer 118 is coupled to a first end 119 of a pipe 120. That pipe 120 connects the strainer 118 to the main water pump 28 which is preferably of the high pressure, triplex plunger type with a rating of 2150 psi and a capacity of 49 gallons per minute or more. This particular pump, of course, is the one selected for the use in the preferred embodiment and other types of pumps may also be employed. Pump 122 is driven in the preferred embodiment by a separate auxiliary engine 124. The plunger type pump 28 is prefered for use over conventional piston type pumps (such as the one employed in the Shaddock machine referred to above) because it can tolerate passage of larger particulate matter and has a longer useful life in this type of equipment.

The outlet from pump 28 is coupled to a swivel, leakproof, rotary coupling member 126 on hose reel 30 by a final pipe 127. Reference to FIG. 2 also shows that the end of water hose 36 remote from cleaner 10 includes a sewer cleaning nozzle 130 inserted into the opening of sewer lateral 63.

The operation of sewer cleaner 10 can now be fully appreciated. The sewer cleaning process is initiated by filling the water tank 30 with clean water, e.g. from a water main or fire hydrant. If the machine is to be used where a water supply is not readily accessible, the machine can be filled at the equipment storage yard or en route to the cleaning sight. It may also be desirable to add water to body 15 before starting the cleaning operation. This decision is based on the type of sewer system being cleaned. In some sewer systems there is a continual flow of water through the system (in which case no filling of the body will be required) while other sewer systems may be practically dry. In the latter case, several hundred gallons of water can be added to the body 15 through a simple water inlet (not shown). Body 15 may have a capacity of in excess of 1000 gallons.

When the machine reaches the cleaning site, hose 34 is inserted into the catch basin 60. Extension tubes (not shown) may be used, if desired, to properly locate the end of hose 36 at the desired depth in the catch basin or manhole. Hose 36 is unwound from reel 30 by an amount sufficient to reach the opening of lateral 63 and a suitable nozzle 130 is coupled thereto. A guide rod is typically employed to insert nozzle 130 into the lateral. All of these operations can be performed by a single operator.

Actual sewer cleaning begins by activating pump engine 124 to initiate water flow through hose 36 and by starting the vacuum pump 32 to initiate the flow of air and water into body 15 through hose 34. The water forced through nozzle 130 will drive the nozzle into lateral 63 and pull hose 36 from hose reel 30. Reel 30 may include a drive means for feeding hose 36 into the lateral at a controlled rate as well as rewinding drive means. Water for the cleaning operation is initially supplied from tank 26, but shortly after the initiation of water flow therefrom and after the level of water in body 15 has reached a preselected level the recycling pump 113 is activated to start water reclamation through the system illustrated in FIG. 2. As indicated in the above description, the air inlet valve 114 is periodically opened to clean the cylindrical screen 110. Throughout the time that water is being forced through nozzle 130, the vacuum system is picking up water and solids from catch basin 60 and depositing the same in body 15.

As cleaning continues, and depending on the amount of water flowing through the sewer system, the body may begin to fill faster than it is being emptied. If the level does reach the level of detector 54, the body 15 will be vented to the atmosphere thereby preventing overfilling. At this point it is customary to drain body 15 by coupling a hose to drain 48 and directing the water back to the catch basin 63.

After completion of the sewer cleaning operation, the hoses are rewound and secured to cleaner 10 and the machine is driven to a disposal site. Remaining liquids are drained from body 15 through drain 48 and cylinders 20 are activated to raise tailgate 18. Ram 45 is then extended to force the pusher plate 42 toward the rear body opening to push the solid debris therefrom. It can be noticed in both FIGS. 2 and 3 that the floor of body 15 is sloped gradually downward toward the tailgate 18 to make the removal of solids 52 and residual liquids easier.

It should be noted with reference to FIG. 1 that the arrangement of the major component of cleaner 10 provides additional operating advantages over a machine such as that disclosed in the aforementioned Shaddock patent. The provision of a horizontally rotatable and vertically elevatable boom 38 makes it easier to properly locate both hoses over a catch basin or manhole and permits the use of cleaner 10 for cleaning catch basins or manholes which are located under sidewalks or median strips, as well as those which are located under the street proper. Cleaner 10 need not be parked with its hose reel directly over the manhole opening permitting cleaner 10 to be parked closer to the curb, leaving one or more lanes of the road open for movement of traffic.

Numerous other minor variations to cleaner 10 could be made by one skilled in the art after reading the foregoing specification. So while the invention has been described in connection with the illustrated preferred embodiment, the invention is not to be limited thereby but is to be limited solely by the claims which follow.

We claim:

1. In a mobile combination sewer and catch basin cleaner of the type including water injection and vacuum loading systems, said water injection system comprising a water tank, a water hose and a first pump means for delivering the water under pressure through said hose, said vacuum system comprising a body and a vacuum hose and a vacuum pump downstream of said vacuum hose and body for vacuum loading said body through said vacuum hose, the improvement comprising:

(a) fluid conduit means coupling the interior of said body to the interior of said water tank;
(b) means for delivering water from said body to said water tank through said conduit means; and
(c) filter means for removing solids from said water delivered to said water tank from said body wherein said filter means comprises a first screen means in said body to remove solids from said water before said water reaches said conduit means, a second screen means in said body intermediate said first screen means and said conduit, said second screen means having smaller openings than said first screen means for removing additional solids from said water, said second screen means comprising a cylindrical screen having a closed end and an open end, said open end of said cylindrical screen surrounding the opening of said conduit to said body and means being provided for periodically cleaning said second screen means, said periodic cleaning means comprising means for periodically admitting air to said conduit means, whereby vacuum pressure in said body will cause said air to pass through second screen means in a direction which is reverse to that of water flow therethrough.

2. The invention set forth in claim 1 wherein said delivery means comprises a second water pump means located intermediate said body and said water tank and adapted for pumping water through said conduit means.

3. The invention set forth in claim 2 wherein a third filter means is provided intermediate said pump and water tank.

4. The invention set forth in claim 3 wherein said third filter means comprises a centrifugal separator adapted for removing fine particulate material from water passing therethrough.

5. The invention set forth in claim 3 wherein fourth filter means are provided intermediate said water tank and said first pump means.

6. The invention set forth in claim 5 wherein said fourth filter means comprises a water strainer.

7. The invention set forth in claim 1 wherein said improvement further comprises means for preventing overfilling of said body.

8. The invention set forth in claim 7 wherein said preventing means comprises a liquid level detector adapted for providing a signal in response to the level of water in said body reaching a predetermined height and means responsive to said signal for venting said body to the atmosphere at an air flow rate sufficient to prevent further vacuum loading thereof.

9. The invention set forth in claim 8 wherein said venting means comprises an opening in said body above said predetermined level and means normally sealing said opening, the sealing means responding to said signal to release said seal and permit atmospheric air to enter the body therethrough.

10. The invention set forth in claim 1 wherein means are provided for filtering the vacuum air, said filter means being located intermediate said body and said vacuum pump.

11. The invention set forth in claim 10 wherein said air filter means comprises cloth filter bags and further including means for periodically cleaning said filter bags of accumulated debris.

12. A mobile sewer and catch basin cleaner comprising a vehicle, a water tank mounted to said vehicle, a first water pump coupled to said water tank for pumping water therefrom and a water hose coupled to said first pump, a material collection body mounted to said vehicle and having an inlet open generally at its roof, vacuum pump means for creating a vacuum in said body, a vacuum hose coupled to said inlet opening for conveying water and solids from a collection site into said body, said mobile cleaner also comprising:
(a) a tailgate for said body normally closing a debris discharge opening at the rear of said body and means for selectively opening and closing said tailgate;
(b) ejector plate means mounted in said body for being moved toward and away from said discharge opening for pushing debris from said body and means for selectively operating said ejector plate means, said ejector plate being normally positioned forwardly of said inlet opening, and having a height which exceeds the height of the water to be loaded in said body and a width just slightly less than the width of said body whereby water can pass along the sides and bottom of said ejector plate, while large solid particles are maintained rearwardly of said ejector plate;
(c) fluid conduit means coupling the interior of said body to the interior of said water tank;
(d) means for delivering water from said body to said water tank through said conduit means; and
(e) filter means for removing solids from said water delivered to said water tank from said body.

13. The invention set forth in claim 12 wherein hydraulic ram means are provided as the means for selectively operating said ejector plate means.

14. The invention set forth in claim 12 wherein said filter means comprises a first screen means in said body forwardly of the normal position of said ejector plate means for removing solids from said water before the water reaches said conduit means.

15. The invention set forth in claim 14 wherein said conduit opens to said body at the forward end thereof and wherein said first screen means comprises a screen cage rearwardly of said opening.

16. The invention set forth in claim 14 wherein said filter means additionally comprises a second screen means intermediate said first screen means and said opening of said conduit to said body, said second screen means having smaller openings than said first screen means for removing additional solids from said water before the water reaches said conduit means.

17. The invention set forth in claim 16 wherein said second screen means comprises a cylindrical screen having a closed end and an open end, said open end of said cylindrical screen surrounding the opening of said conduit to said body.

18. The invention set forth in claim 16 wherein means are provided for periodically cleaning said second screen means.

19. The invention set forth in claim 18 wherein said cleaning means comprises means for periodically admitting air to said conduit means whereby vacuum pressure in said body will cause said air to pass through said second screen means in a direction which is reverse to that of water flow therethrough.

20. The invention set forth in claim 16 wherein said delivery means comprises a second water pump means located intermediate said body and said water tank and adapted for pumping water through said conduit means.

21. The invention set forth in claim 20 wherein a third filter means is provided intermediate said second pump and said water tank.

22. The invention set forth in claim 21 wherein said filter means comprises a centrifugal separator adapted for removing fine particulate material from water passing therethrough.

23. The invention set forth in claim 22 wherein means are provided for returning fine particulate material removed by said separator to said body rearwardly of said ejector means.

24. The invention set forth in claim 23 wherein said returning means comprises a conduit coupled to said separator and the interior of said body, said return being aided by the vacuum in said body.

25. The invention set forth in claim 21 wherein fourth filter means are provided intermediate said water tank and said first pump means.

26. The invention set forth in claim 25 wherein said fourth filter means comprises a water strainer.

27. The invention set fourth in claim 12 wherein said improvement further comprises means for preventing overfilling of said body.

28. The invention set forth in claim 27 wherein said preventing means comprises a liquid level detector adapted for providing a signal in response to the level of water in said body reaching a predetermined height and means responsive to said signal for venting said body to the atmosphere at an air flow rate sufficient to prevent further vacuum loading thereof.

29. The invention set forth in claim 28 wherein said venting means comprises an opening in said body above said predetermined level and means normally sealing said opening, said sealing means responding to said signal to release said seal and permit atmospheric air to enter the body therethrough.

30. The invention set forth in claim 12 wherein means are provided for filtering the vacuum air, said filter means being located intermediate said body and said vacuum pump.

31. The invention set forth in claim 30 wherein said air filter means comprises screen means and cloth filter bags and further includes means for periodically cleaning said filter bags of accumulated debris.

32. The invention set forth in claim 12 wherein said vehicle comprises a truck having a cab at its forward end and the remaining components rearwardly of said cab, said water tank being located generally forwardly of said body and said vacuum and water pumps being located forwardly of said water tank, a water hose reel mounted to said truck chassis forwardly of said water tank, said cleaner including elongate boom means mounted rearwardly of said cab but extending thereover, said boom means supporting said water and said vacuum hoses for sewer cleaning.

33. The invention set forth in claim 32 wherein said boom means is horizontally rotatable and vertically elevatable so that said hoses can be precisely located relative to a sewer cleaning site generally adjacent the cab of such vehicle.

34. In a mobile combination sewer and catch basin cleaner of the type including water injection and vacuum loading systems, said water injection system comprising a water tank, a water hose and a first pump means for delivering the water under pressure through said hose, said vacuum system comprising a body and a vacuum hose and a vacuum pump downstream of said vacuum hose and body for pneumatically loading said body through said vacuum hose, the improvement comprising:
  (a) fluid conduit means coupling the interior of said body to the interior of said water tank;
  (b) means for delivering water from said body to said water tank through said conduit means;
  (c) filter means for removing solids from said water delivered to said water tank from said body; and
  (d) means for preventing overfilling of said body, said preventing means comprising a liquid level detector adapted for providing a signal in response to the level of water in said body reaching a predetermined height and means responsive to said signal for venting said body to the atmosphere at an air flow rate sufficient to prevent further pneumatic loading thereof.

35. The invention set forth in claim 34 wherein said venting means comprises an opening in said body above said predetermined level and means normally sealing said opening, the sealing means responding to said signal to release said seal and permit atmospheric air to enter the body therethrough.

* * * * *